Figure 1:
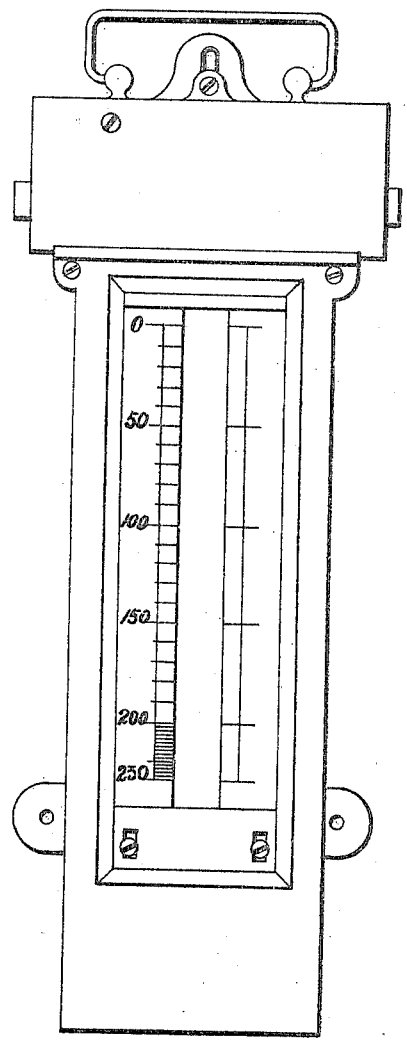

No. 811,538. PATENTED FEB. 6, 1906.
C. O. BASTIAN.
ELECTROLYTIC ELECTRICITY METER.
APPLICATION FILED MAR. 10, 1904.

3 SHEETS—SHEET 1.

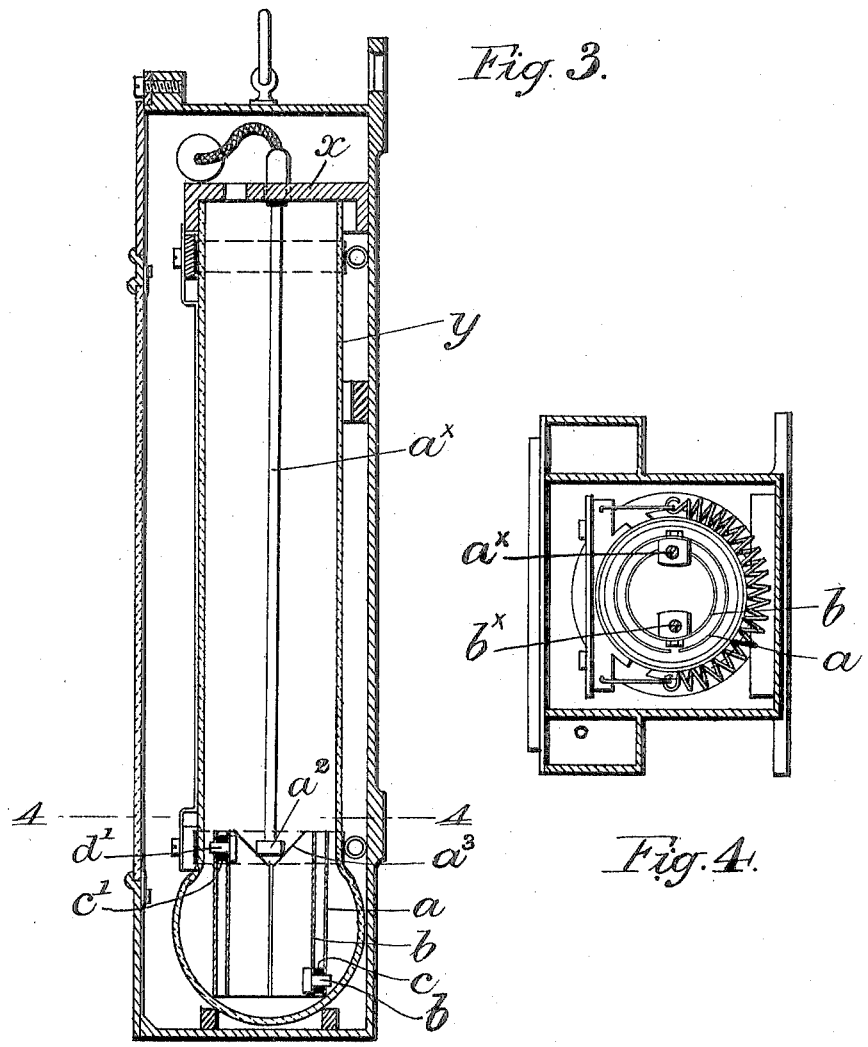

No. 811,538. PATENTED FEB. 6, 1906.
C. O. BASTIAN
ELECTROLYTIC ELECTRICITY METER.
APPLICATION FILED MAR. 10, 1904.

3 SHEETS—SHEET 3.

UNITED STATES PATENT OFFICE.

CHARLES O. BASTIAN, OF LONDON, ENGLAND, ASSIGNOR TO THE BASTIAN METER COMPANY LIMITED, OF LONDON, ENGLAND.

ELECTROLYTIC ELECTRICITY-METER.

No. 811,538.      Specification of Letters Patent.      Patented Feb. 6, 1906.

Application filed March 10, 1904. Serial No. 197,580.

*To all whom it may concern:*

Be it known that I, CHARLES ORME BASTIAN, electrical engineer, a subject of the King of Great Britain, residing at London, England, have invented certain new and useful Improvements in or Relating to Electrolytic Electricity-Meters, of which the following is a specification.

This invention relates to that type of electrolytic electricity-meters wherein the measure of current which has passed through the meter is indicated by the variation in a column or body of electrolyte which is decomposed or dissipated by the current passing through same, (see my British Patents No. 13,594 of 1897, No. 5,034 of 1898, No. 21,228 of 1900, and No. 969 of 1901, and my United States Patents Nos. 626,134 and 626,135, granted May 30, 1899, and No. 693,216, granted February 11, 1902,) and has for its objects to reduce the amount of energy consumed in the operation of the meter, to enable more accurate readings to be taken of its records while current is passing through the instrument, and to improve the meter in other respects, particularly as to economy in construction, and generally to improve the efficiency of the meter as a current-recording device or instrument.

Although said previous patents are not confined to any specific metals for the electrodes or liquids for the electrolyte, nevertheless certain parts of said patents more particularly describe the application of platinum electrodes in a solution of sulfuric acid and water, and platinum being a rare metal it has been found necessary to show how it may be mounted in thin sheets, so that such sheets may have a positive position one to the other and may be mechanically secure against injury or displacement.

It is common knowledge that iron electrodes may be used in a solution of caustic soda and water for the production of oxygen or hydrogen by electrolysis, and iron electrodes could be advantageously used thus if drawn into or located in a vulcanite or other suitable casing, such as described in the aforesaid Letters Patent, which casing would prevent the oxidation of the iron leading-in wires or other portions of the electrodes by preventing their exposure to the air at the surface of the electrolyte.

Now according to my present invention I combine with and arrange in electrolytic electricity-meters of the character described (having a suitable electrolyte) electrodes comprising two or more hollow bodies of any suitable metal, one of which bodies envelops the other body or bodies, (said bodies being of any suitable form,) which bodies are secured relatively to one another and spaced apart (advantageously equidistant) from one another and suitably supported and connected to the terminals of the meter, such conductor-rods advantageously being formed of nickel, and also the aforesaid hollow metal bodies may be formed of nickel and advantageously of very thin sheet-nickel, (for example of a thickness of only about twenty-four Birmingham wire-gage,) and, furthermore, in practice I find it advantageous to form said hollow metal bodies (from said thin sheet-nickel) as cylinders of different diameters adapted to be secured concentrically relatively to one another; but in all cases such cylinders or other hollow bodies of metal should be secured closely to one another, but always spaced apart from one another and advantageously equidistant from one another, the object in all cases being to obtain a very large electrode-surface.

The electrodes may be of any suitable form; but I may advantageously form or use them as concentric tubes, (which may be split or slotted,) so as to obtain a very large electrode-surface.

Either of the electrodes may have the scale engraved or otherwise provided thereon, the position of which electrodes or of the scale thereon may be made adjustable (in any convenient manner—by the properly authorized person) in order to facilitate resetting the instrument to zero, and where the electrodes are cylinders or tubes both of which or the outermost of which extend upward beyond the top of the electrolyte the scale or index would be on the outermost tube, and with this construction the surface of the liquid between or inside the concentric tubes would be disturbed while current is passing and the surface of the liquid outside the outermost tube or scale-tube would be comparatively still and the reading of the instrument would be thus facilitated.

The electrodes may pass through the whole depth or any desired depth of the electrolyte, if so desired, and their relative positions may be positively arranged in any convenient way—for instance, by securing same to one another by means of china studs or other suitable clamps, fixings, or separators.

Figure 2:
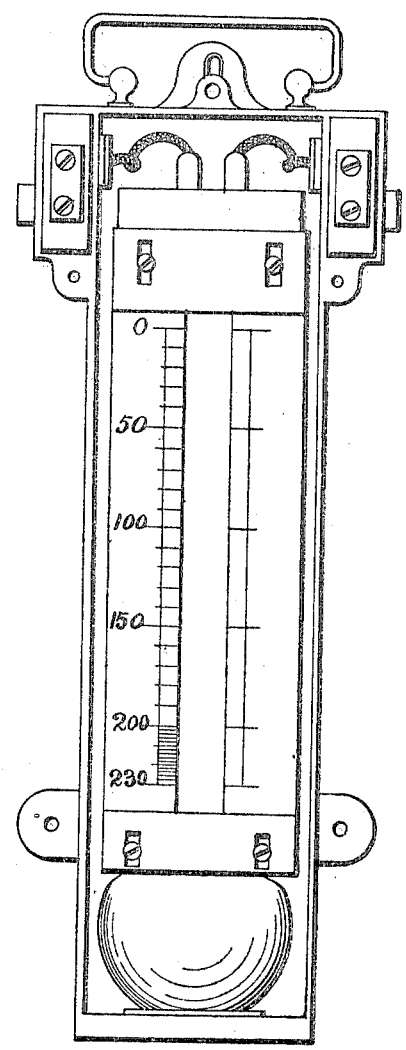
Figure 5:
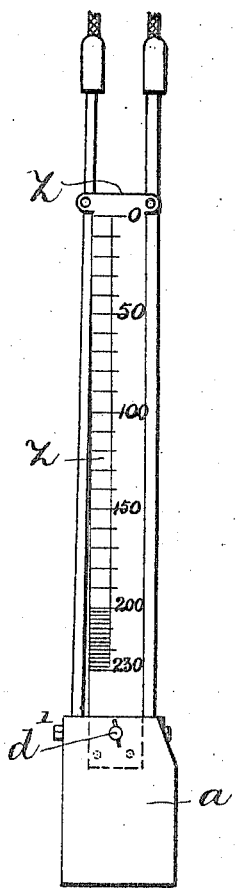
Figure 6:
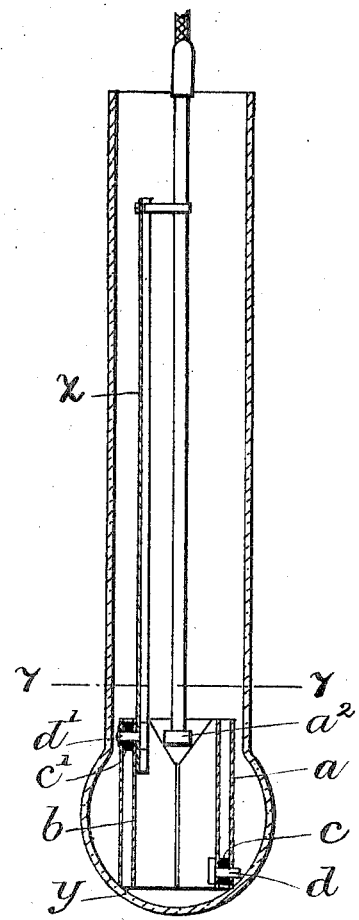
Figure 7:
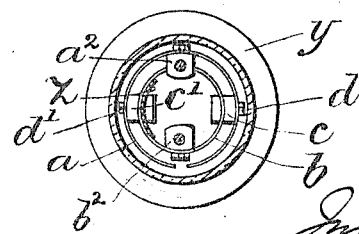

Referring to the accompanying drawings, Figure 1 is a front view in elevation of an electrolytic electricity-meter having my present improvements applied thereto. Fig. 2 is a similar view with the hinged front of the meter removed, showing the interior. Fig. 3 is a vertical transverse sectional view showing the cylindrical electrodes in section. Fig. 4 is a cross-sectional view on line 4 4, Fig. 3. Figs. 5 to 7 illustrate the arrangement and construction wherein one of the electrodes or an extension thereof or thereon is engraved or otherwise provided with a scale or index, which latter is located inside the vessel holding the electrolyte and is consequently wholly or partially submerged in the electrolyte and is seen and read through the glass wall of said vessel, Fig. 5 being a view of the electrodes (consisting of two concentric cylinders with conductor-rods, all of nickel, as aforesaid, attached thereto) removed from the meter and provided with a narrow metal strip, advantageously also of nickel and vertically mounted on the electrodes, while Fig. 6 shows the same arranged in position within the vessel for holding the electrolyte, Fig. 7 being a cross-sectional view on line 7 7, Fig. 6.

The general character of this type of meter—known as the "Bastian" meter—is so well known that it is not considered necessary to describe here anything further than the present improvements in this type of meter.

The electrodes comprise the cylinders $a\ b$ and conductor-rods $a^\times\ b^\times$, $a$ being the outer electrode and $b$ the inner electrode, each of cylindrical form, and the cylindrical bodies concentrically arranged close to one another, but rigidly held spaced apart from one another—viz., by the blocks or distance-pieces $c\ c'$, of insulating material, and short bolts $d\ d'$. The conductor rods or parts $a^\times\ b^\times$ are attached to their respective cylinders $a\ b$ by screwing or otherwise securing same to the ears or lugs $a^2\ b^2$, fixed to or formed on the respective cylinders $a\ b$, the inner cylinder $b$ being cut away, as shown at $a^3$, to clear the ear $a^2$ on cylinder $a$. The conductor rods or parts $a^\times\ b^\times$ being simply of metal (nickel) are of course held from touching one another by any suitable means—as, for example, by simply passing same through two separated holes in an insulatory cap $x$ on the top of the vessel $y$, holding the electrolyte.

Referring now more particularly to Figs. 5 to 7, $z$ is a narrow strip or band of metal (nickel) attached to and extending upward from either one of the cylinders $a$ or $b$, said vertical strip or band $z$ extending up to nearly or toward the top of the vessel $y$, the upper end of this strip or band $z$ being (advantageously) attached by any suitable insulatory means to the conductor-rods $a^\times\ b^\times$ (or to one only of such rods) to thereby hold steady said strip or band $z$, which is calibrated or engraved or provided with the index or scale in any suitable way, and when made of nickel neither the said strip $z$ nor the scale or index thereof is effected by immersion in the electrolyte, and, moreover, this scale—thus arranged and immersed in the electrolyte—enables the same to be very easily adjusted and set. This strip or band $z$ must of course be made of a material which will not be injuriously affected by—and will not itself injuriously affect—the action of the meter.

The scales may be calibrated in any suitable way, but advantageously by the process described by the aforesaid Letters Patent, proper allowance being made for the variation from the theoretical value in the volume of the liquid dissipated by the electric current, and a very correct basis of calibration is that .346 cubic centimeters of water at 60° Fahrenheit are dissipated by one ampere-hour of electricity.

Having now described my invention, what I claim as new, and desire to secure by Letters Patent of the United States, is—

1. In electrolytic electricity-meters of the character described, the combination with an electrolyte, of electrodes mounted therein, and a scale supported by the electrodes and arranged to measure the column of the electrolyte, substantially as described.

2. In electrolytic electricity-meters of the character described; the combination with a suitable electrolyte, of electrodes comprising suitably-supported hollow bodies of suitable metal one of which bodies envelops the other body said bodies being secured relatively to one another and spaced apart from one another and connected to the terminals of the meter, and a meter index or scale arranged inside the vessel holding the electrolyte said index or scale being mounted on one of said hollow bodies, substantially as and for the purposes described.

3. In electrolytic electricity-meters of the character described; the combination with a suitable electrolyte, of electrodes comprising cylinders of thin sheet-nickel one of which cylinders envelops the other cylinder said nickel cylinders being of different diameters and being secured concentrically and closely relatively to—but spaced apart from—one another and suitably connected to and supported by nickel conductor-rods which extend above the electrolyte and are connected to the terminals of the meter, and a meter index or scale arranged inside the vessel holding the electrolyte said index or scale being secured to one of said cylinders and to said conductor-rods, substantially as and for the purposes described.

In witness whereof I have hereunto set my hand in presence of two witnesses.

CHAS. O. BASTIAN.

Witnesses:
H. D. JAMESON,
A. NUTTING.